Aug. 23, 1960    H. T. WILTON    2,950,106
STAGE FOR OPTICAL PROJECTOR
Filed Dec. 16, 1957    2 Sheets-Sheet 1
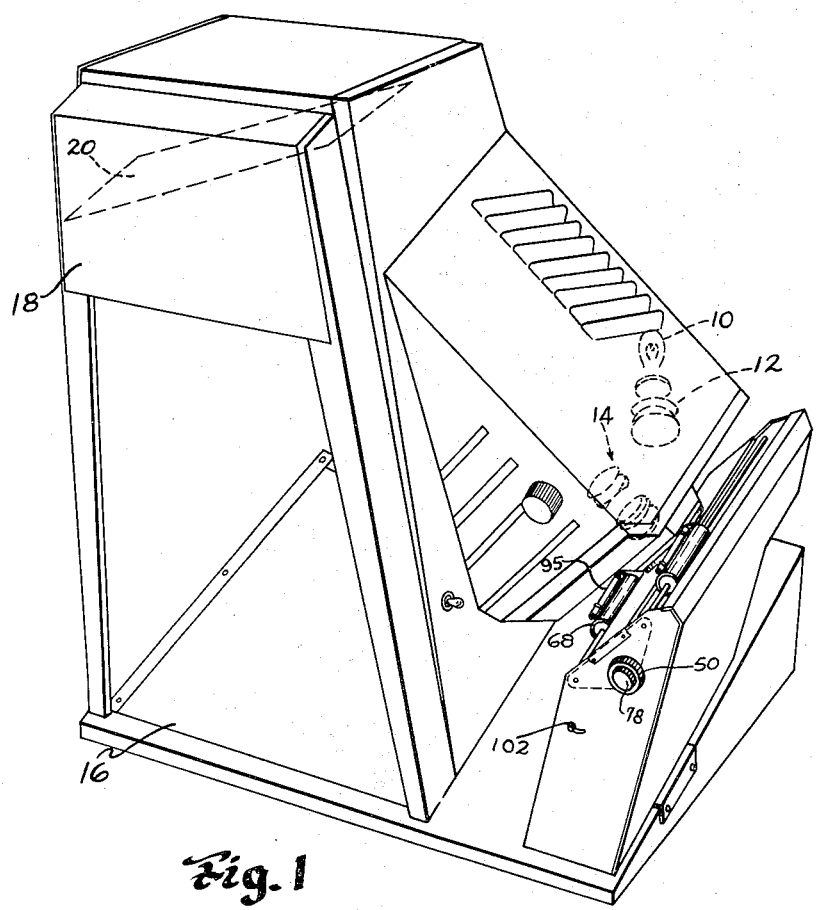
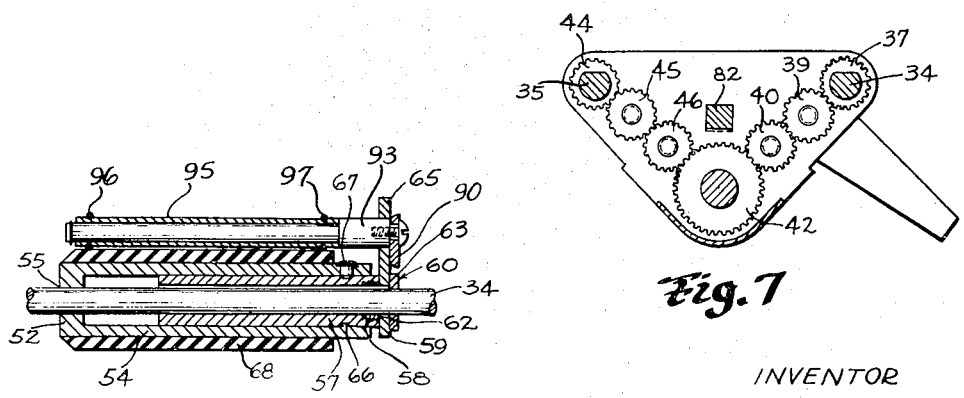
INVENTOR
HENRY T. WILTON
By Herbert C. Kimball
ATTORNEY

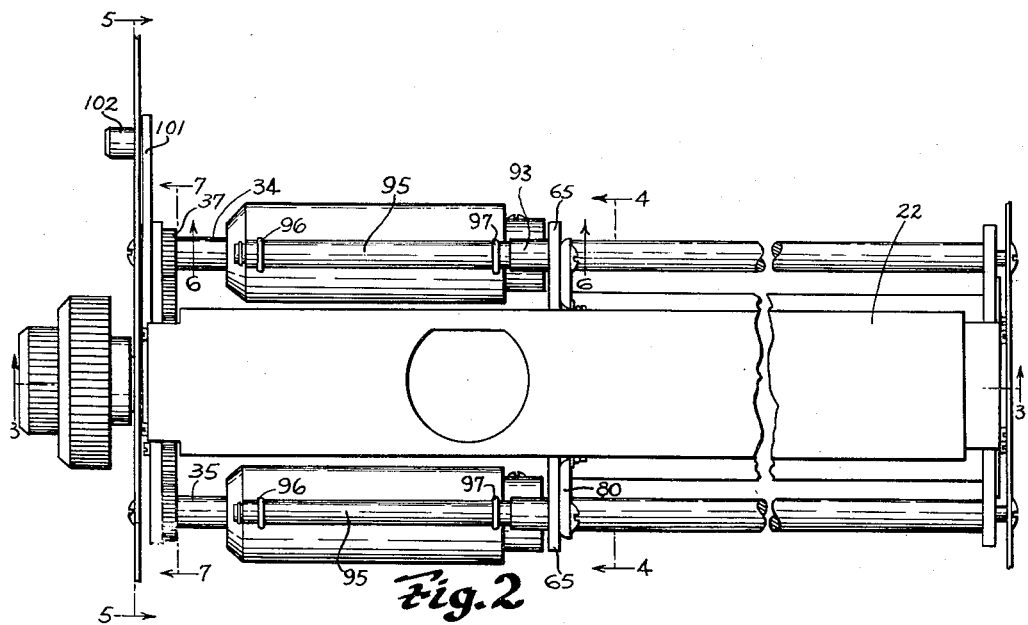
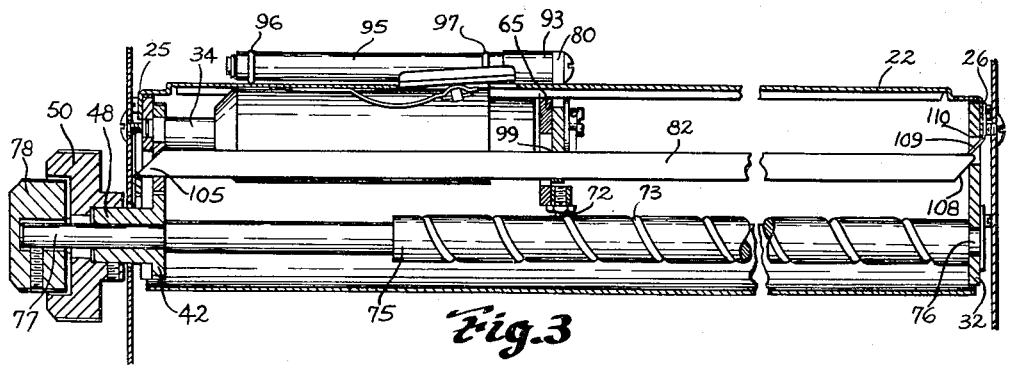
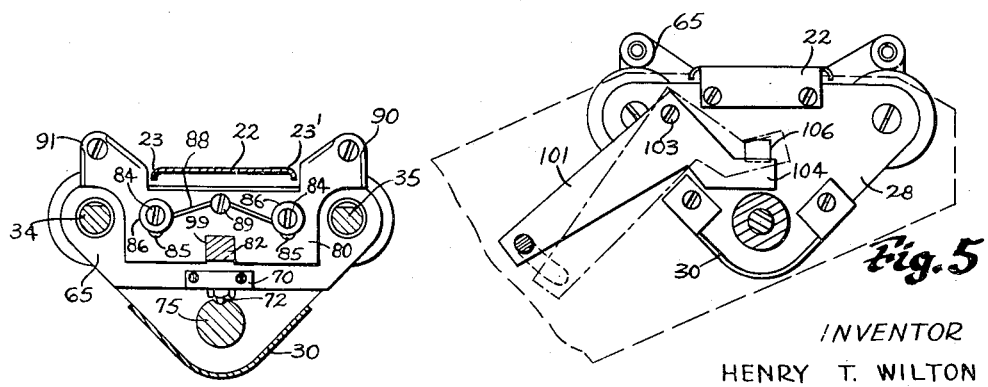

United States Patent Office 2,950,106
Patented Aug. 23, 1960

2,950,106

STAGE FOR OPTICAL PROJECTOR

Henry T. Wilton, Buffalo, N.Y., assignor to American Optical Company, Southbridge, Mass., a voluntary association of Massachusetts Filed Dec. 16, 1957, Ser. No. 703,126

1 Claim. (Cl. 271—51)

This invention concerns the translating of sheet material to various positions on a plate or stage, and is particularly concerned with the positioning of a selected portion of reading material within the field of an optical projector.

An object of the invention is to obtain ready and accurate positioning of that portion of the material which is to be projected for viewing, separate controls being provided for transverse and longitudinal movements of the material respectively. A further object is to facilitate operation of these separate controls by their convenient arrangement.

To control the positioning of the sheet material on the plate, I propose to support a pair of gripping rollers on each side of the plate for gripping the sheet material and moving it both longitudinally and laterally of the plate. Moving the sheet material laterally over the plate is a simple matter, calling merely for rotation of the rollers. Moving the sheet material longitudinally calls for bodily movement of the rollers; and problems must be overcome in providing continuity in the operations of the mechanism for rotating the rollers and for separating them, while permitting the gripping rollers be thus moved bodily to a new position longitudinally of the plate. A stage illustrative of my invention is disclosed in the accompanying drawings and described in the following description; and demonstrates how these difficulties may be overcome.

Fig. 1 is a perspective view of an optical projector incorporating a stage for positioning sheet material which is constructed in accordance with my invention.

Fig. 2 is a plan view of the stage alone.

Fig. 3 is a vertical section on the line 3—3 in Fig. 2.

Fig. 4 is a transverse vertical section on the line 4—4 in Fig. 2.

Fig. 5 is a detail view showing the mechanism for separating the gripping rollers, and is a transverse vertical section on the line 5—5 in Fig. 2.

Fig. 6 is a central vertical section through one pair of gripping rollers, this section being indicated by the line 6—6 in Fig. 2.

Fig. 7 is a detail view showing gearing for driving the gripping rollers, and is a vertical section on the line 7—7 in Fig. 2.

One use to which my improved stage may be put is the positioning of a selected portion of reading material within the field of an opaque projector such as is shown in Fig. 1. Light from a source 10 is collected by a condenser 12 so as to fall upon the reading material resting on the stage. An objective 14 throws an image of a selected portion of the reading material upon a screen 16 which is protected from stray light by the housing 18 of the projector. In order to keep the size of the projector within a moderate compass, a mirror 20 directs the image forming rays from the objective 14 onto the screen 16.

The plate 22 of the stage is secured at its ends to the frame of the stage. The plate 22 may be economically formed of sheet metal with rolled side edges 23, 23', and downturned end flanges 25 and 26. A front frame member 28 connects the flange 25 to the front end of the valley member 30, and a rear frame member 32 connects the flange 26 to the rear end of the valley member 30, thus constituting a substantial and adequately rigid frame for the stage at moderate cost. Two pairs of gripping rollers, one pair at each side of the plate 22 are supported so that their grip is in the plane of the plate 22. The supporting mechanism which I have devised for these gripping rollers makes it possible to move sheet material laterally or longitudinally of the plate 22. At the same time the gripping rollers can be separated at any location with respect to the plate 22, so as to release the sheet material.

This supporting mechanism for the rollers includes two rotatable drive shafts 34 and 35, one arranged adjacent and below each side edge of the plate 22. The ends of the two shafts 34 and 35 are journalled in the front and rear frame members 28 and 32. Inside the front frame member 28, the shaft 34 carries a driving gear 37 which is driven through idler gears 39 and 40 from the main actuating gear 42. The other shaft 35 carries a driving gear 44 which is driven through idler gears 45 and 46 from the main gear 42. The hub 48 of the main gear 42 extends through the front frame member 28 so as to be rotated by the knob 50 fixed on this hub. Accordingly, when the knob 50 is rotated, shafts 34 and 35 are rotated simultaneously and in the same direction. Reversal of the direction of rotation of the knob 50 reverses the direction of rotation of this pair of shafts 34 and 35.

Each of the shafts 34 and 35 is flattened on one side to establish a driving connection with the hub 52 of the core member 54 of a lower gripping roller. The hub 52 has an opening 55 which is flattened on one side to correspond with the drive shaft; and the driving connection with the hub 52 permits this lower gripping roller to slide longitudinally of the drive shaft, functioning as a spline connection. A bearing member 57 has threads 58 within its outer end which receive the threaded end 59 of a sleeve nut 60. This threaded end 59 is of small enough diameter to pass through an opening 62 in a yoke 65, but the head 63 of the nut 60 is larger than the opening 62.

The roller member 54 is rotatably supported on the bearing member 57 and splined thereto by a set-screw 67 which rotates in a groove 66 in the bearing member 57. A cover member 68 of rubber or composition is pulled over the core member 54. The end 59 of the nut is engaged in the threads 58 of the bearing member 57, and the nut is tightened to draw the end of the bearing member 57 snug against the yoke 65. This structure is duplicated in the lower gripping roller on the other side of the plate 22. Since each bearing member is held rigid with the yoke 65 the rollers 54 mounted thereon are moved longitudinally of the shafts 34 and 35 in response to movements of yoke 65 due to the spline connection 66, 67. Thus each of the shafts 34 and 35 carries a lower gripping roller 54, 68 which is rotated when the respective shaft is rotated, and which slides longitudinally of the shaft with the yoke 65 when the latter is moved longitudinally thereof.

The yoke 65 carries a bracket 70 into which is screwed a depending follower 72. The rounded end of the follower engages in the spiral groove 73 formed in the worm drive 75. The latter has one end 76 journalled in the rear frame member 32, while the other end 77 extends through the hub 48 of the main gear 42 and the knob 50 carried thereby. A knob 78 on the end 77 of the worm drive 75 rotates the latter to move the follower 72 and with it the yoke 65 longitudinally of the shafts 34 and 35. Accordingly, two coaxial knobs 50 and 78 control the positioning of sheet material on the plate 22, the knob 78 moving the material longitudinally and the knob 50 shifting the material laterally of the plate.

A carrier 80 rotatably mounting the upper roller of each pair of gripping rollers is engaged by an elevator 82 for releasing the material from the grip of the pairs of rollers. The carrier 80 is in the form of a plate shiftable relative to the yoke 65. Flanged screws 84 pass through a pair of slots 85 in the carrier 80 and are screwed into the yoke 65. The flanges 86 of the screws 84 are wide enough to hold the alinement of the carrier 80 as it slides relative to the yoke 65. A wire spring 88 engages the necks of the screws 84 and applies downward pressure on a pin 89 on the carrier 80 so as to bias the carrier downwardly.

A pair of ears 90 and 91 on the carrier 80 extend above the shafts 34 and 35. A bearing shaft 93 is secured to each of the ears 90 and 91, and each of the bearing shafts 93 rotatably supports an upper gripping roller 95. Rubber contact rings 96 and 97 may be used on these upper gripping rollers if desired. Sheet material on the plate 22 will be in the plane of the grip of each pair of gripping rollers.

The elevator 82 for releasing the gripping rollers is in the form of a square rod extending without contact through an opening in the yoke 65 and engaging in a slot 99 in the carrier 80, the slot 99 having such width as to receive the rod 82 and such depth that the spring 88 will cause gripping by the rollers when the elevator 82 is in lowered position, and the elevator will promptly start to shift the carrier 80 when it is lifted. As shown in Fig. 3 both ends of rod 82 are bevelled, and both ends extend into rectangular openings in the front and rear frame members 28 and 32. These bevelled ends act as cam surfaces in the following manner. A lever 101 operated by knob 102 and pivoted to the front frame member 28 at 103 has an arm 104 which underlies the front end 105 of rod 82. The top of this front end 105 is bevelled and engages the rectangular opening 106 in member 28 when the lever 101 is swung to lift the rod 82. The bevelled end 105 acts as a cam to force the longitudinal movement of rod 82 when this end is lifted by lever arm 104. The longitudinal movement of rod 82 causes its other bevelled end 108 to act as a cam and lift this end of the rod 82 against the action of spring 109 as the end 108 is forced further into the rectangular opening 110 in rear frame member 32. The effect of the knob 102 in swinging the lever 101 is to give a uniform lifting movement throughout the length of the elevator 82. For this reason, the elevator 82 is equally effective in releasing the grip of the pairs of gripping rollers, no matter where longitudinally of the plate 22 they happen to be when such release is called for.

In the operation of the stage the operator uses the lever 101 to actuate the elevator 82 and lift the upper rollers 95. Sheet material may then be inserted, and when the lever 101 withdraws its support from the elevator, the spring 88 forces the carrier 80 to return to the position in which the pairs of rollers grip the sheet. (At this time the spring 109 returns the elevator 82 to original position.) When the sheet is thus gripped, the operator may turn either knob 50 or knob 78, or both. When knob 50 is turned the sheet gripped by the rollers is moved laterally, because the two gear trains actuated by the knob 50 rotate the shafts 34 and 35, and through the connections to hubs 52 rotate the lower gripping rollers to shift the sheet. It is obvious that only one of each pair of gripping rollers need be actuated.

When knob 78 is turned, the sheet gripped by the rollers is carried longitudinally with the rollers, because the rotation of the worm drive imparts through the follower 72 a longitudinal movement to the yoke 65 which moves with it the carrier 80. As above explained the lower rollers move with the yoke 65 and the upper rollers are carried by the carrier 80, so that the upper and lower rollers are moved in synchronism for the longitudinal shifting of the sheet material. After being shifted the rollers may be rotated or the rollers may be separated as the shafts 34 and 35 are in driving relation to the lower rollers at all times, and moreover the elevator 82 is ready to shift the carrier 80. This gives the operator convenient and effective control of the positioning of sheet material on the stage.

I claim:

A stage for an optical projector comprising a frame, two pairs of rollers for gripping sheet material and positioning a selected portion of said sheet material at the axis of said optical projector, two drive shafts rotatably supported in parallelism by said frame, one extending through each of the lower rollers of said pairs and having a spline connection therewith, a yoke connected to said lower rollers for shifting them longitudinally of said drive shaft, a carrier plate rotatably mounting both upper rollers of said pairs, said plate being carried by said yoke so as to slide vertically relative thereto, an elevator rod carried by said frame parallel to said drive shafts and extending through said carrier plate and slidable relative thereto to permit longitudinal movement of said yoke and plate relative to said frame, said plate being engageable by said elevator rod at any longitudinal position of said carrier plate to raise said plate and release material gripped between said pairs of rollers, means for raising said elevator rod relative to said frame, and a spring for biasing said carrier plate and the upper rollers carried thereby toward gripping relation with the lower rollers of said pairs.

References Cited in the file of this patent

UNITED STATES PATENTS

| | | |
|---|---|---|
| 1,062,569 | McLaughlin | May 20, 1913 |
| 1,131,997 | Cooper | Mar. 16, 1915 |
| 2,033,529 | Lee | Mar. 10, 1936 |
| 2,037,705 | Chapman | Apr. 21, 1936 |
| 2,150,243 | Page | Mar. 14, 1939 |
| 2,223,334 | Robison | Nov. 26, 1940 |
| 2,282,843 | Adler | May 12, 1942 |
| 2,337,567 | North et al. | Dec. 28, 1943 |
| 2,724,988 | Peters | Nov. 29, 1955 |
| 2,767,610 | Hintz et al. | Oct. 23, 1956 |
| 2,813,457 | Fitz Gerald | Nov. 19, 1957 |
| 2,880,647 | Swinnerton | Apr. 7, 1959 |